United States Patent
Chen et al.

(10) Patent No.: US 11,518,342 B2
(45) Date of Patent: Dec. 6, 2022

(54) IDENTIFICATION OF VEHICLE OPERATORS

(71) Applicant: Ford Global Technologies, LLC, Dearborn, MI (US)

(72) Inventors: Yifan Chen, Ann Arbor, MI (US); Kwaku O. Prakah-Asante, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 150 days.

(21) Appl. No.: 17/145,433

(22) Filed: Jan. 11, 2021

(65) Prior Publication Data
US 2022/0219642 A1 Jul. 14, 2022

(51) Int. Cl.
*B60R 25/01* (2013.01)
*B60N 2/00* (2006.01)
*H04W 4/40* (2018.01)
*H04L 67/306* (2022.01)

(52) U.S. Cl.
CPC .............. *B60R 25/01* (2013.01); *B60N 2/002* (2013.01); *H04L 67/306* (2013.01); *H04W 4/40* (2018.02)

(58) Field of Classification Search
None
See application file for complete search history.

(56) References Cited

U.S. PATENT DOCUMENTS

| | | | |
|---|---|---|---|
| 9,067,565 B2 | 6/2015 | McClellan et al. | |
| 9,623,878 B2 | 4/2017 | Tan et al. | |
| 9,665,997 B2 | 5/2017 | Morgan et al. | |
| 9,688,286 B2 | 6/2017 | Wilkes, III et al. | |
| 2010/0007523 A1 | 1/2010 | Hatav | |
| 2012/0252496 A1* | 10/2012 | Chien | H04W 4/48 455/456.3 |
| 2014/0088793 A1* | 3/2014 | Morgan | B60R 16/037 701/2 |
| 2014/0195252 A1 | 7/2014 | Gruber et al. | |

(Continued)

FOREIGN PATENT DOCUMENTS

DE 102013006087 A1 * 1/2014 ........... B60R 16/037

OTHER PUBLICATIONS

Lee, B.G., et al. "A Smartphone-Based Driver Safety Monitoring System Using Data Fusion," Sensors, www.mdpi.com/journal/sensors, 2012, 17 pages.

(Continued)

*Primary Examiner* — Jonathan A Bui
(74) *Attorney, Agent, or Firm* — Brandon Hicks; Bejin Bieneman PLC (57) ABSTRACT

A computer includes a processor and a memory storing instructions executable by the processor to, in response to a mobile device synchronizing with a vehicle, identify a first profile from a plurality of profiles stored in the memory as associated with the mobile device by extracting a predetermined set of information from data storing contact information for a plurality of contacts on the mobile device and determining that the predetermined set of information matches data in the first profile; determine that a person associated with the first profile is an operator of the vehicle; and then perform an operation in accordance with at least one setting stored in the first profile.

19 Claims, 5 Drawing Sheets

(56) References Cited

U.S. PATENT DOCUMENTS

| | | | |
|---|---|---|---|
| 2014/0240089 A1* | 8/2014 | Chang | G06Q 30/0207 |
| | | | 340/5.61 |
| 2014/0309866 A1* | 10/2014 | Ricci | G06F 21/32 |
| | | | 701/36 |
| 2016/0269524 A1* | 9/2016 | Stottlemyer | H04M 1/6091 |
| 2016/0288796 A1* | 10/2016 | Yuan | B60R 25/01 |
| 2017/0217428 A1 | 8/2017 | Tan et al. | |
| 2019/0098127 A1* | 3/2019 | Gupta | B60R 25/255 |
| 2020/0172112 A1* | 6/2020 | Kawashima | B60W 50/08 |
| 2021/0046888 A1* | 2/2021 | Vardharajan | B60W 40/08 |

OTHER PUBLICATIONS

Lu, D.N., et al., "Vehicle Mode and Driving Activity Detection Based on Analyzing Sensor Data of Smartphones," Sensors, www.mdpi.com/journal/sensors, 2018, 25 pages.

Ma, et al., "DrivingSense: Dangerous Driving Behavior Identification Based on Smartphone Autocalibration," Mobile Information Systems vol. 2017, Article ID 9075653, 16 pages.

Galarza, E., et al., "Real Time Driver Drowsiness Detection Based on Driver's Face Image Behavior Using a System of Human Computer Interaction Implemented in a Smartphone," Universidad de las Fuerzas Armadas—ESPE, Sangolqui, Ecuador, 2018, 10 pages.

* cited by examiner

IDENTIFICATION OF VEHICLE OPERATORS

BACKGROUND

Various settings in a vehicle are adjustable by an operator of the vehicle. Examples of settings adjustable by the operator include seat position values such as longitudinal position of the operator seat, height of the seat bottom of the operator seat, tilt of the seat bottom of the operator seat, recline angle of the seatback of the operator seat, lumbar support position in the operator seat, etc.; driving mode selection from among sport mode, eco mode, comfort mode, etc.; angular positions of side mirrors of the vehicle; column incline and extension of a steering wheel; choice of radio station; etc.

DETAILED DESCRIPTION

The system herein tracks a profile for a vehicle operator, e.g., a driver. The profile can be identified by using information derived from a data store of a mobile device belonging to the operator. Using this information allows a vehicle computer to avoid storing some personally identifiable information about the operators. Moreover, the profiles can store preferences of the operators for settings of the vehicle, which can be used to help ensure that the owner of an identified mobile device is the operator of the vehicle rather than a passenger. By identifying who the operator of the vehicle is, the system can perform an operation specific to that operator.

A computer includes a processor and a memory storing instructions executable by the processor to, in response to a mobile device synchronizing with a vehicle, identify a first profile from a plurality of profiles stored in the memory as associated with the mobile device by extracting a predetermined set of information from data storing contact information for a plurality of contacts on the mobile device and determining that the predetermined set of information matches data in the first profile; determine that a person associated with the first profile is an operator of the vehicle; and then perform an operation in accordance with at least one setting stored in the first profile.

A computer includes a processor and a memory storing instructions executable by the processor to, in response to a mobile device synchronizing with a vehicle, identify a first profile from a plurality of profiles stored in the memory as associated with the mobile device by extracting a predetermined set of information from data storing contact information for a plurality of contacts on the mobile device and determining that the predetermined set of information matches data in the first profile; determine that a person associated with the first profile is an operator of the vehicle; and then perform an operation in accordance with a setting stored in the first profile.

Identifying the first profile as associated with the mobile device may include determining that a unique identifier of the mobile device matches a unique identifier in the first profile.

Identifying the first profile as associated with the mobile device may include, in response to determining that the predetermined set of information does not match the data in any of the profiles stored in the memory, determining that a unique identifier of the mobile device matches a unique identifier in the first profile. Identifying the first profile as associated with the mobile device may include, upon determining that the predetermined set of information does not match the data in any of the profiles stored in the memory and that the unique identifier of the mobile device does not match the data in any of the profiles stored in the memory, creating the first profile and then storing the predetermined set of information and the unique identifier of the mobile device in the first profile. Determining that the person associated with the first profile is the operator may include, upon creating the first profile, determining that the vehicle is in motion and that passenger seats of the vehicle are unoccupied.

The setting may be a first setting, and determining that the person associated with the first profile is the operator may include determining a likelihood that a profile associated with the mobile device from the profiles is associated with the operator based on at least one value of at least one respective second setting of the vehicle that is adjustable by the operator. The instructions may further include instructions to, after determining that the person associated with the first profile is the operator, store the at least one value of the at least one second setting in the first profile.

The at least one second setting may include at least one seat position value.

Determining that the person associated with the first profile is the operator may include determining that the vehicle is in motion and that passenger seats of the vehicle are unoccupied.

The instructions may further include instructions to determine that the operator failed to perform an action in response to a message from a user interface prompting the operator to perform the action; then adjust a message threshold stored in the first profile to make the message occur less frequently; and provide the message upon receiving data beyond the message threshold. The instructions may further include instructions to store the failure to perform the action in the first profile, receive data indicating that the operator performed the action in response to the message, and store the performance of the action in the first profile. The instructions may further include instructions to calculate a probability that the operator performs the action in response to the message based on the performances of the action and the failures to perform the action stored in the first profile. The instructions may further include instructions to, in response to the probability being less than a probability threshold, adjust the message threshold stored in the first profile to make the message occur less frequently. The instructions may further include instructions to, in response to the probability being greater than the probability threshold, one of keep the message threshold constant or adjust the message threshold to make the message occur more frequently.

Calculating the probability may be based on the performances of the action and the failures to perform the action stored in the first profile that occurred within a predetermined previous distance traveled by the vehicle.

The data may indicate that the operator failed to perform the action in response to the message when the action is not performed for at least a predetermined time threshold after the message.

Performing the operation may include adjusting a component of the vehicle to match the setting. The component may be a seat.

A method includes, in response to a mobile device synchronizing with a vehicle, identifying a first profile from a plurality of profiles stored in the memory as associated with the mobile device by extracting a predetermined set of information from data storing contact information for a plurality of contacts on the mobile device and determining that the predetermined set of information matches data in the first profile; determining that a person associated with the first profile is an operator of the vehicle; and then performing an operation in accordance with at least one setting stored in the first profile.

With reference to the Figures, a computer 32 includes a processor and a memory storing instructions executable by the processor to, in response to a mobile device 60 synchronizing with a vehicle 30, identify a first profile from a plurality of profiles stored in the memory as associated with the mobile device 60 by extracting a predetermined set of information from data storing contact information for a plurality of contacts on the mobile device 60 and determining that the predetermined set of information matches data in the first profile; determine that a person associated with the first profile is an operator O of the vehicle 30; and then perform an operation in accordance with at least one setting stored in the first profile.

Figure 1:
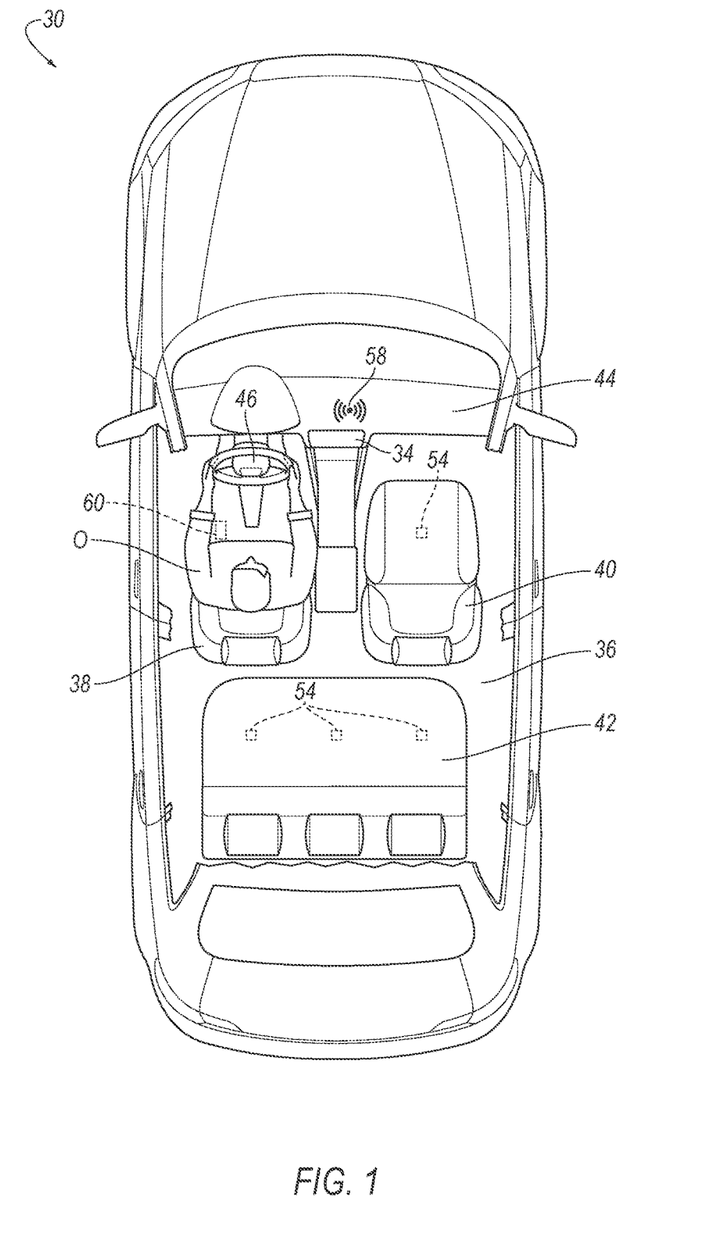
FIG. 1 is a top view of an example vehicle with a passenger cabin exposed for illustration.

With reference to FIG. 1, the vehicle 30 may be any passenger or commercial automobile such as a car, a truck, a sport utility vehicle, a crossover, a van, a minivan, a taxi, a bus, etc.

The vehicle 30 includes a passenger cabin 36 to house occupants, if any, of the vehicle 30. The passenger cabin 36 includes an operator seat 38 and a front passenger seat 40 disposed at a front of the passenger cabin 36 and one or more back passenger seats 42 disposed behind the operator seat 38 and front passenger seat 40. The passenger cabin 36 may also include third-row passenger seats (not shown) at a rear of the passenger cabin 36. In FIG. 1, the operator seat 38 and front passenger seat 40 are shown to be bucket seats, and the back passenger seats 42 are shown to be bench seats, but the seats 38, 40, 42 may be other types. The position and orientation of the seats 38, 40, 42 and components thereof are settings that are adjustable by an occupant.

An instrument panel 44 may be disposed at a forward end of the passenger cabin 36 and face toward the operator seat 38 and front passenger seat 40. The instrument panel 44 may include vehicle controls, such as a steering wheel 46; gauges, dials, and information displays; heating and ventilation equipment; a radio and other electronics; some or all of the user interface 34; etc.

Figure 2:
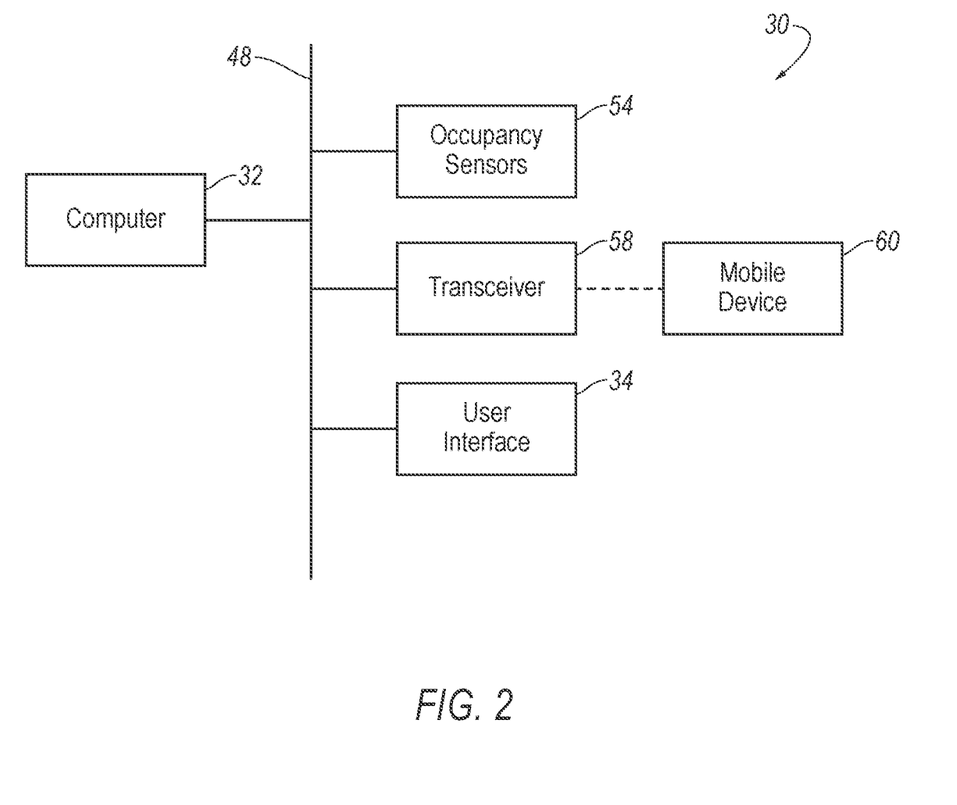
FIG. 2 is a block diagram of the vehicle.

With reference to FIG. 2, the computer 32 is a microprocessor-based computing device, e.g., a generic computing device including a processor and a memory, an electronic controller or the like, a field-programmable gate array (FPGA), an application-specific integrated circuit (ASIC), etc. The computer 32 can thus include a processor, a memory, etc. The memory of the computer 32 can include media for storing instructions executable by the processor as well as for electronically storing data and/or databases, and/or the computer 32 can include structures such as the foregoing by which programming is provided. The computer 32 can be multiple computers coupled together.

The computer 32 may transmit and receive data through a communications network 48 such as a controller area network (CAN) bus, Ethernet, WiFi, Local Interconnect Network (LIN), onboard diagnostics connector (OBD-II), and/or by any other wired or wireless communications network. The computer 32 may be communicatively coupled to occupancy sensors 54, a transceiver 58, the user interface 34, and other components via the communications network 48.

With reference to FIGS. 1 and 2, the occupancy sensors 54 are configured to detect occupancy of the seats 38, 40, 42. The occupancy sensors 54 may be visible-light or infrared cameras directed at the seats 38, 40, 42, weight sensors inside the seats 38, 40, 42, sensors detecting whether seatbelts for the seats 38, 40, 42 are buckled or unspooled, or other suitable sensors.

The transceiver 58 is adapted to transmit signals wirelessly through any suitable wireless communication protocol, such as Bluetooth®, WiFi, IEEE 802.11a/b/g, other RF (radio frequency) communications, etc. The transceiver 58 may be adapted to communicate with a remote server, that is, a server distinct and spaced from the vehicle 30, such as a mobile device 60. The transceiver 58 may be one device or may include a separate transmitter and receiver.

The mobile device 60 is a portable computing device such as a mobile phone, e.g., a smartphone, or a tablet. The mobile device 60 is a computing device including a processor and a memory. The mobile device 60 is owned and carried by a person who may be the operator O of the vehicle 30 at any given time. The mobile device 60 has a unique identifier such as a media access control (MAC) address. A MAC address is a unique identifier assigned to a computing device for use as a network address. The MAC address can be used by network protocols such as Ethernet, Wi-Fi, and Bluetooth®.

The memory of the mobile device 60 can store data for the owner, i.e., can include a data store, including data storing identifying information for a plurality of persons, i.e., contacts. The contacts data store is a collection of data, primarily contact information, for people with some connection to the owner of the mobile device 60. For example, the contacts data store can include a name, multiple phone numbers, multiple email addresses, multiple social media handles, etc. for each entry on the contacts data store. Some of the fields may be empty for any given entry in the contacts data store.

The user interface 34 is a human-machine interface (HMI) that presents information to and receives information from an occupant of the vehicle 30. Some or all of the user interface 34 may be located, e.g., on the instrument panel 44 in a passenger cabin 36 of the vehicle 30, or wherever may be readily seen by the occupant. The user interface 34 may include dials, digital readouts, screens, speakers, and so on for providing information to the occupant, e.g., human-machine interface (HMI) elements such as are known. The user interface 34 may include buttons, knobs, keypads, microphone, and so on for receiving information from the occupant.

The computer 32 stores a plurality of profiles in memory. Each profile is associated with one person, who may be the operator O of the vehicle 30 at any given time. A profile accordingly is defined herein as a stored set of a variety of information specific to the associated person, including information for identifying the mobile device 60 of the associated person and preferred settings of the associated person for components of the vehicle 30, as will both be described in more detail below. Each profile stores the foregoing information if available, but individual fields in the profile can be blank if the information is not available or not yet available.

Each profile includes information for identifying a mobile device 60 as the mobile device 60 belonging to the associated person. As described in more detail below, the computer 32 can identify the mobile device 60 as part of a process 300 for identifying the profile of the operator O of the vehicle 30. Specifically, each profile includes the unique identifier, typically the MAC address, of the mobile device 60 of the associated person, as described above. When the mobile device 60 is connected to the computer 32 through the communications network 48, the computer 32 can verify that the profile is associated with the mobile device 60 by comparing the unique identifier of the mobile device 60 with the unique identifier stored in the profile, as described below. Each profile further includes a predetermined set of information from data storing contact information for a plurality of contacts, i.e., the contacts data store, on the mobile device 60. The profile stores a predetermined set of information from the contacts data store, which can be thought of as a "signature" of the contacts data store. The contacts data store, as well as the predetermined set of information from the contacts data store, is highly likely to be unique to a single person, making it useful for identifying the profile. For example, the predetermined set of information can be an ordered list of total numbers of particular types of information stored in the contacts data store: Contacts List Signature {Number of Contacts, Number of Mobile Phone Numbers, Number of Work Phone Numbers, Number of Email Addresses, Numbers of Each Zip Code, Numbers of Foreign Addresses, . . . }. For another example, the predetermined set of information can be one or more predetermined calculations performed on an item of information from the contacts data store. The predetermined set of information can avoid using any personally identifiable information of the person while still being unique to the person.

Each profile further includes values for settings of the vehicle 30, at least some of which are adjustable by the operator O. The settings were set by or for the associated person while the associated person was the operator O. Examples of settings adjustable by the operator O include seat position values such as longitudinal position of the operator seat 38, height of the seat bottom of the operator seat 38, tilt of the seat bottom of the operator seat 38, recline angle of the seatback of the operator seat 38, lumbar support position in the operator seat 38, etc.; driving mode selection from among sport mode, eco mode, comfort mode, etc.; angular positions of side mirrors of the vehicle 30; column incline and extension of the steering wheel 46; choice of radio station; etc. Each profile can include historical values of the settings for each time the associated person was the operator O of the vehicle 30.

Some of the settings can be message thresholds for respective messages to be provided to the associated person when the associated person is the operator O. Each type of message has a corresponding type of action that the operator O is prompted to perform. For the purposes of this disclosure, a type of message is a category of message having a trigger corresponding to the category and an action for the operator O to perform corresponding to the category. Types of messages can include a prompt to download a software update, an oil-change reminder, a prompt to enter information, etc. The information can be, e.g., a nickname for the vehicle 30 or the operator O, a decision to sign up or decline to sign up for a service, etc. The types of messages are not limited to these types.

Figure 4:
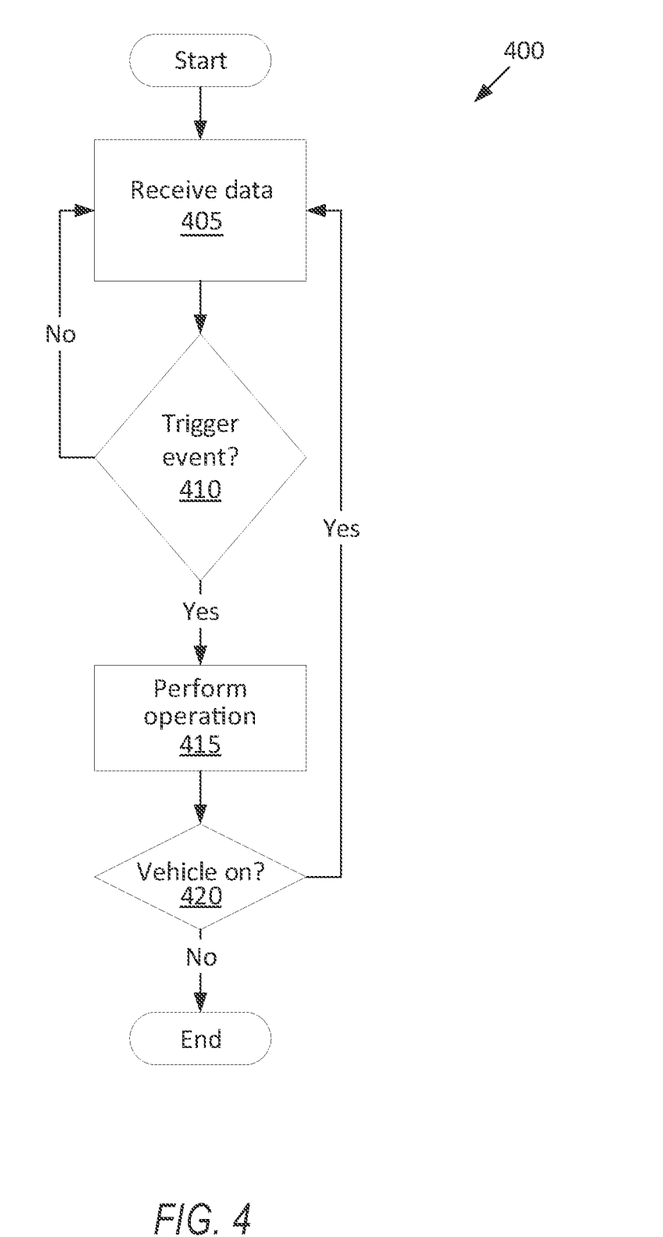
FIG. 4 is a process flow diagram of an example process to perform an operation for the operator of the vehicle.

How the message thresholds are used when providing the messages is described below with respect to a process 400. In general, when data is beyond the message threshold for a type of message, that message is provided to the operator O. "Beyond" can mean either above or below depending on the type of message.

Figure 3:
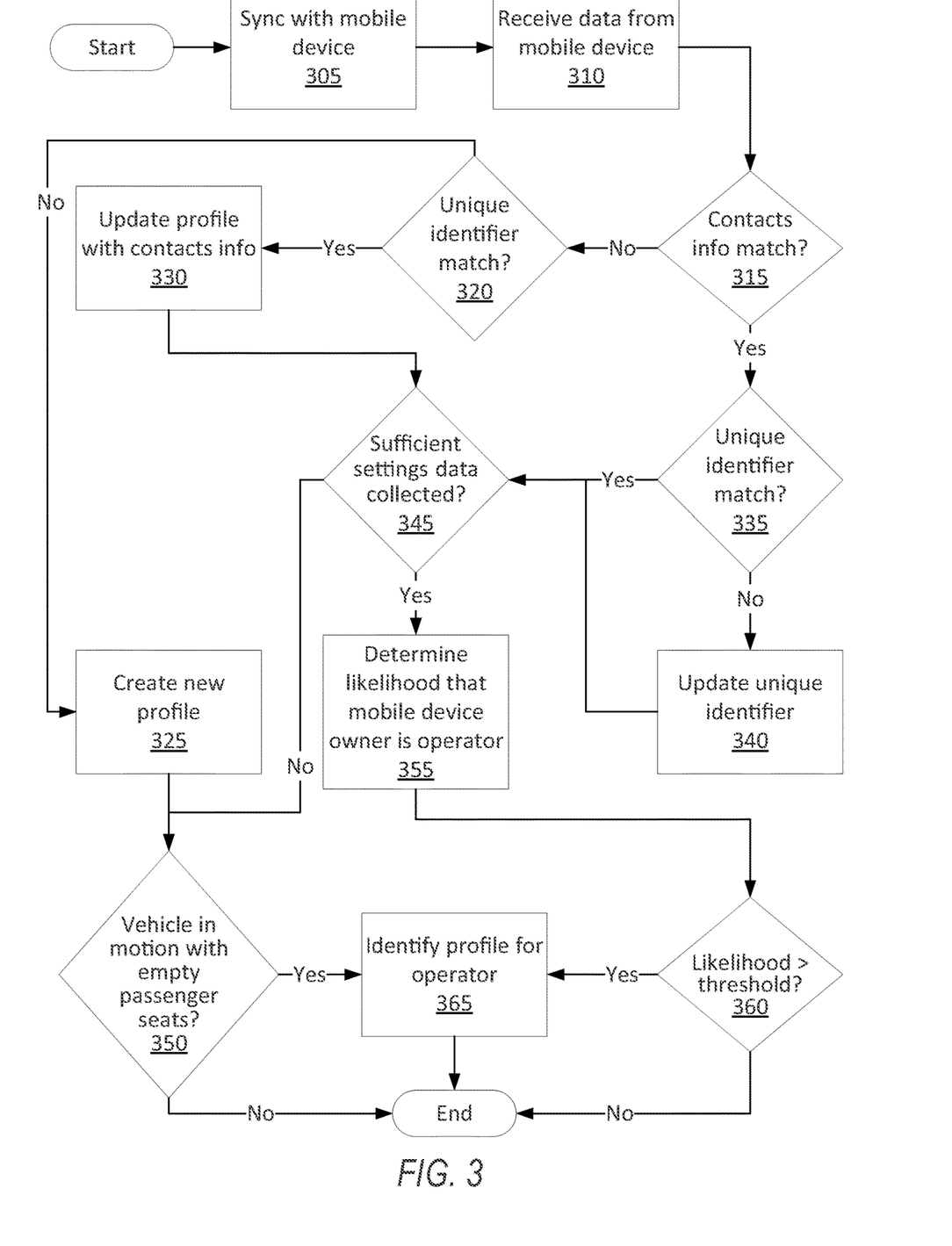
FIG. 3 is a process flow diagram of an example process to identify a profile for an operator of the vehicle.

FIG. 3 is a process flow diagram illustrating an exemplary process 300 for identifying the profile for the operator O of the vehicle 30. The identified profile is referred to as the "first profile." The memory of the computer 32 stores executable instructions for performing the steps of the process 300 and/or programming can be implemented in structures such as mentioned above. At a high level, the computer 32 identifies a profile associated with the mobile device 60 in response to the mobile device 60 synchronizing with the vehicle 30 in blocks 305-340 and then determines that that profile is the first profile, i.e., that the person associated with the profile is the operator O of the vehicle 30, as opposed to being a passenger of the vehicle 30, in blocks 345-365. As a general overview of the process 300, the computer 32 synchronizes with and receives data from a mobile device 60; identifies a profile associated with the mobile device 60 if either the predetermined set of information from the contacts data store or the unique identifier, e.g., MAC address, of the mobile device 60 match one of the stored profiles; creates a new profile if not; determines a likelihood that the profile associated with the mobile device 60 is associated with the operator O based on the settings data stored in the profile if sufficient settings data are collected in that profile; identifies the profile associated with the mobile device 60 as the first profile if either the likelihood is greater than a threshold or the vehicle 30 is in motion with the passenger seats 40, 42 empty.

The process 300 begins in a block 305, in which the computer 32 synchronizes the mobile device 60 with the vehicle 30, also called pairing. Synchronizing means that the mobile device 60 and the computer 32 establish a communication channel, either wired or wirelessly, e.g., via Bluetooth®. The communication channel between the computer 32 and the mobile device 60 can be via the transceiver 58. A single mobile device 60 synchronizes with the vehicle 30 at a time. If multiple mobile devices 60 are present in the passenger cabin 36 or near the vehicle 30, one of the mobile devices 60 can be chosen according to a priority list of the mobile devices 60 stored in the computer 32.

Next, in a block 310, the computer 32 receives data from the mobile device 60, including the unique identifier, e.g., MAC address, and the contacts data store.

Next, in a decision block 315, the computer 32 extracts the predetermined set of information from the contacts data store and determines whether the predetermined set of information matches data stored in any of the profiles. For example, the predetermined set of information matches data stored in one of the profiles if each item in the Contacts List Signature above for the contacts data store is the same as what is stored in that profile. By using the predetermined set of information, the computer 32 can avoid storing and using personally identifiable information (other than a MAC address or the like). Moreover, the computer 32 can identify a profile for a newly acquired mobile device 60 having a different MAC address than stored in the profile because the contacts data store is typically transferred from old to new mobile devices 60. In response to determining that the predetermined set of information matches one of the profiles, the matching profile is associated with the mobile device 60, and the process 300 proceeds to a decision block 335. In response to determining that the predetermined set of information does not match the data in any of the profiles stored in the computer 32, the process 300 proceeds to a decision block 320.

In the decision block 320, the computer 32 determines whether the unique identifier, in the present example the MAC address, of the mobile device 60 matches a unique identifier, e.g., MAC address, stored in any of the profiles. For example, MAC addresses match if the alphanumeric strings forming the MAC addresses are the same. In response to determining that the unique identifiers match, the matching profile is associated with the mobile device 60, and the process 300 proceeds to a block 330. In response to determining that the unique identifier does not match any of the profiles stored in the computer 32, the process 300 proceeds to a block 325.

In the block 325, i.e., in the situation in which neither the predetermined set of information nor the unique identifier from the mobile device 60 match any of the stored profiles, the computer 32 creates a new profile and then stores the predetermined set of information from the contacts data store and the unique identifier of the mobile device 60 in the new profile. The new profile is associated with the mobile device 60. After the block 325, the process 300 proceeds to a decision block 340.

In the block 330, i.e., in the situation in which the unique identifier matched one of the profiles but the predetermined set of information did not, the computer 32 updates the profile associated with the mobile device 60 with the predetermined set of information from the contacts data store of the mobile device 60. After the block 330, the process 300 proceeds to the decision block 345.

In the decision block 335, the computer 32 determines whether the unique identifier of the mobile device 60 matches the unique identifier stored in the profile that was associated with the mobile device 60 in the decision block 315 above. If the unique identifiers match, the process 300 proceeds to the decision block 345. If the unique identifiers do not match, the process 300 proceeds to a block 340.

In the block 340, i.e., in the situation in which the predetermined set of information matched one of the profiles but the unique identifier did not, the computer 32 updates the profile associated with the mobile device 60 with the unique identifier of the mobile device 60. After the block 340, the process 300 proceeds to the decision block 345.

In the decision block 345, i.e., in the situation in which the mobile device 60 is associated with a preexisting profile, the computer 32 determines whether the profile associated with the mobile device 60 has stored sufficient data about the adjustable settings used by the operator O. For example, the computer 32 can determine whether the number of historical values for at least one of the settings is greater than a threshold number. The threshold number can be chosen to be sufficiently large to provide statistical confidence in the determination of the likelihood in a block 355 below. If the settings data in the profile is not sufficient, the process 300 proceeds to the decision block 350. If the settings data is sufficient, the process 300 proceeds to the block 355.

In the decision block 350, i.e., in the situation in which no or insufficient settings data is collected, the computer 32 determines whether the vehicle 30 is in motion while the front passenger seat 40 and back passenger seats 42 are empty. The computer 32 uses data received from the occupancy sensors 54 to make the determination. If the vehicle 30 is in motion while only the operator seat 38 is occupied, then the mobile device 60 presumably belongs to the operator O and not to a passenger. If the vehicle 30 is in motion while the front passenger seat 40 and back passenger seats 42 are empty, the process 300 proceeds to a block 365. If not, the process 300 ends without identifying one of the profiles as the first profile, i.e., as the profile of the operator O.

In the block 355, the computer 32 determines a likelihood that the profile associated with the mobile device 60 is associated with the operator O based on values of the settings. For example, for each setting, the historical values of the setting can be used to generate a probability distribution, e.g., a normal distribution as follows:

$$y_i = f(x_i \mid \mu_i, \sigma_i) = \frac{1}{\sigma_i \sqrt{2\pi}} e^{\frac{-(x_i-\mu_i)^2}{2\sigma_i^2}}$$

in which y is the output of the probability distribution, x is the independent variable, $\mu$ is the mean of the historical values of the setting, $\sigma$ is the standard deviation of the historical values of the setting, and i is an index tracking the type of setting. The probability distributions can be calculated using only the historical values of the settings from within a predetermined previous distance traveled by the vehicle 30, e.g., 5,000 miles, in order to adjust to changing preferences of the operator O. The likelihood can be determined as a weighted sum of the probabilities for each setting taking on the current value of that setting if the person associated with the identified profile is the operator O:

$$\text{Likelihood} = \sum_{i=1}^{N} w_i y_i$$

in which i is the index tracking the settings, N is the total number of settings, $w_i$ is a weight for the ith setting, and $y_i$ is the output of the probability distribution for the ith setting when the independent variable $x_i$ is the current value of the setting. The weights $w_i$ can sum to one. The weights $w_i$ can be chosen based on survey experiments with potential operators to determine the relative contribution each setting makes as a predictor.

Next, in a block 360, the computer 32 determines whether the likelihood is greater than a likelihood threshold. The likelihood threshold can be chosen to minimize false positives based on experimenting on various operators. If the likelihood is greater than the likelihood threshold, the process 300 proceeds to the block 365. If the likelihood is less than the threshold, the process 300 ends without identifying one of the profiles as the first profile, i.e., as the profile of the operator O.

In the block 365, the computer 32 identifies the profile associated with the mobile device 60 as the first profile, i.e., as the profile associated with the operator O. As described below in the process 400, the settings in the identified profile, i.e., the first profile, are used for performing operations for the operator O. After the block 365, the process 300 ends.

FIG. 4 is a process flow diagram illustrating an exemplary process 400 for performing an operation for the operator O. The memory of the computer 32 stores executable instructions for performing the steps of the process 400 and/or programming can be implemented in structures such as mentioned above. As a general overview of the process 400, while the vehicle 30 is on, the computer 32 receives data relevant to a trigger event for performing an operation and, if the data indicates that the trigger event has occurred, performs the operation in accordance with the settings stored in the first profile.

The process 400 begins in a block 405, in which the computer 32 receives data relevant for determining whether a trigger event has occurred in a decision block 410 below. For example, the data can include a time and date, a mileage of the vehicle 30, and/or data received via the transceiver 58.

Next, in a decision block 410, the computer 32 determines whether the data indicates that a trigger event has occurred. If a trigger event has not occurred, the process 400 returns to the block 405 to continue monitoring the data. If a trigger event has occurred, the process 400 proceeds to a block 415.

For example, one trigger event can be that a first preset duration has elapsed since starting the vehicle 30. The first preset duration can be chosen to permit sufficient time for the computer 32 to perform the process 300 above. The computer 32 can subtract the time at which the vehicle 30 started from a current time received in the block 405.

For another example, one trigger event can be that the data is beyond any of the message thresholds, e.g., a second preset duration has elapsed since a previous time that the user interface 34 prompted the operator O to enter information or download a software update, or a distance has fallen below a preset distance until a mileage at which an oil change is recommended. The message thresholds, e.g., the second preset duration, the preset distance, etc., can be settings stored in the first profile and can be adjusted as described in a process 500 below. If the first profile is identified, i.e., as in the block 365 of the process 300 above, then the message thresholds stored in the first profile are used. If a profile for the operator O is not identified, the computer 32 uses default values stored in memory for the message thresholds. The message thresholds can be chosen based on the respective operation or action. For example, the default second preset duration for a message can be chosen to be long enough that at most one message prompting for information will occur in a single trip, e.g., twelve hours. The computer 32 can compare the time and date of the previous message with the current time and date received in the block 405. For another example, the default preset distance can be chosen to give the operator O sufficient time to schedule an oil change before the recommended mileage, e.g., 500 miles before reaching 5000 miles since the last oil change. The computer can compare the mileage of the last oil change with the current mileage received in the block 405.

For another example, one trigger event can be that a new software update has become available, according a message received via the transceiver 58 from a remote server.

In the block 415, the computer 32 performs the operation corresponding to the trigger event satisfied in the decision block 410. For example, in response to the first preset duration elapsing since the vehicle 30 started, the computer 32 can adjust a component of the vehicle 30 to match the settings stored in the first profile, e.g., the operator seat 38 by adjusting seat position values, a transmission (not shown) by selecting a driving mode, the side mirrors and/or the steering wheel 46 by adjusting their positions, a radio in the user interface 34 by choosing a radio station, etc. For another example, in response to a new software update becoming available or the second preset duration elapsing since the operator O was last prompted to download the software update, the computer 32 can instruct the user interface 34 to provide the message to the operator O to download the software update. The message can include a visual display of an icon and/or text corresponding to the type of message, an audible sound and/or prerecorded speech corresponding to the type of the message, and/or haptic feedback such as through the operator seat 38 and/or the steering wheel 46. For another example, in response to the second preset duration elapsing since the operator O was last prompted to enter the information, the computer 32 can instruct the user interface 34 to provide the message to the operator O to enter the information. For another example, in response to the distance until the next recommended oil change falling below the preset distance, the computer 32 can instruct the user interface 34 to provide the message to the operator O that an oil change is due.

Next, in a decision block 420, the computer 32 determines whether the vehicle 30 is still on. If the vehicle 30 is still on, the process 400 returns to the block 405 to continue monitoring the data. If the vehicle 30 is off, the process 400 ends.

Figure 5:
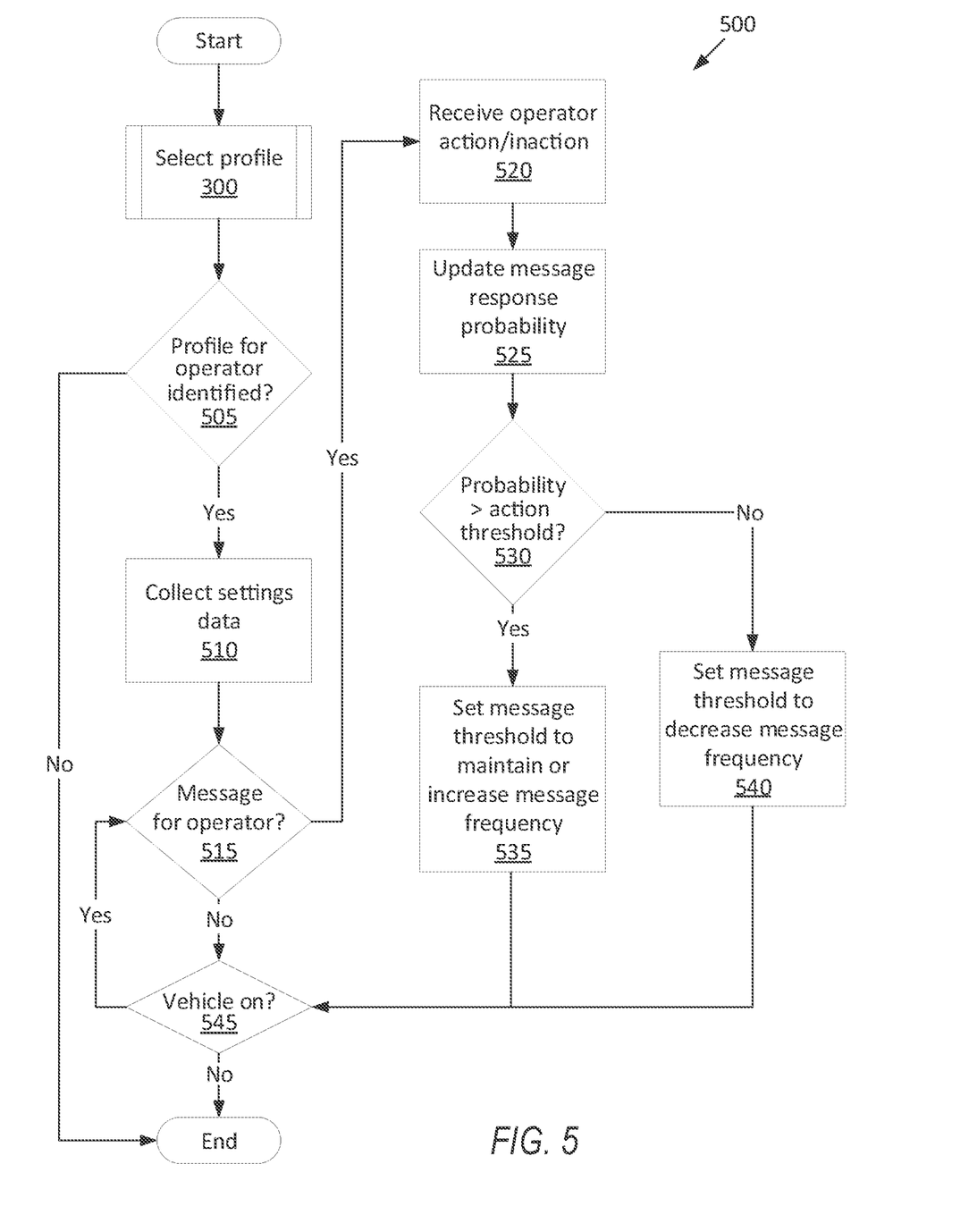
FIG. 5 is a process flow diagram of an example process to update the profile for the operator of the vehicle.

FIG. 5 is a process flow diagram illustrating an exemplary process 500 for updating the profile for the operator O of the vehicle 30. The memory of the computer 32 stores executable instructions for performing the steps of the process 500 and/or programming can be implemented in structures such as mentioned above. As a general overview of the process 500, if the first profile of the operator O was identified in the process 300, the computer 32 collects settings data to add to the first profile; then for as long as the vehicle 30 is on, updates a message response probability in the first profile based on action or inaction by the operator O in response to the message, adjusts the message threshold to make the message occur more frequently or at the same frequency in response to the message response probability being above an action threshold, and adjusts the message threshold to make the message occur less frequently in response to the message response probability being below the action threshold.

The process 500 begins by performing the process 300 to select the first profile from the stored profiles.

Next, in a decision block 505, the computer 32 determines whether the first profile was identified in the process 300, i.e., whether the block 365 of the process 300 was performed. If the first profile was identified, the process 500 proceeds to a block 510. If the first profile was not identified, the process 500 ends.

In the block 510, the computer 32 stores the values of the settings in the first profile. The current values of the settings thus become an instance of the historical values of the settings used to generate the probability distributions in the block 355 of the process 300.

Next, in a decision block 515, the computer 32 determines whether a message is being provided for the operator O. A determination of when to provide a message to the operator O is described above with respect to the process 400. If a message is provided to the operator O, the process 500 proceeds to a block 520. If a message is not being provided to the operator O, the process 500 proceeds to a decision block 545, in order to return to this decision block 515 to keep checking for messages to the operator O as long as the vehicle 30 is on.

In the block 520, the computer 32 receives data indicating whether or not the operator O performed the action prompted by the message, specifically within a predetermined threshold corresponding to the type of message. The data indicate that the operator O failed to perform the action in response to the message when the action is not performed for at least the predetermined threshold after the message. For example, if the message prompts the operator O to enter information, the computer 32 receives data indicating whether the operator O entered the information within a corresponding predetermined threshold, e.g., a time chosen according to experimental data on how quickly operators typically respond to that type of message. If the message prompts the operator O to download a software update, the computer 32 receives data indicating whether the operator O selected to accept the download, as opposed to dismissing the message, within a corresponding predetermined threshold, e.g., a time chosen according to experimental data on how quickly operators typically respond to that type of message. If the message prompts the operator O to perform an oil change, the computer 32 receives data indicating whether the operator O has had an oil change performed within a corresponding predetermined threshold, e.g., a distance in which a promptly scheduled oil change would typically be performed, e.g., 200 miles. The computer 32 stores the performance of the action or the failure to perform the action prompted by the message in the first profile. As the block 520 is typically executed multiple times while the operator O is operating the vehicle 30, historical instances of whether the operator O performed the action prompted by the message are stored in the first profile for each type of message.

Next, in a block 525, the computer 32 calculates a probability that the operator O performs the action in response to the message based on the performances of the action and the failures to perform the action stored in the first profile, e.g., $P_j=N_j/M_j$, in which P is the probability that the operator O performs the action, j is an index tracking the type of message, N is the number of performances of the action by the operator O stored in the first profile, and M is the number of times the message was provided to the operator O stored in the first profile, i.e., the sum of the performances and failures to perform the action stored in the first profile. For some types of messages, the probability can be calculated using only the performances of the action and failures to perform the action that occurred within a predetermined previous distance traveled by the vehicle 30, e.g., 5,000 miles, in order to adjust to changing preferences of the operator O.

Next, in a decision block 530, the computer 32 determines whether the probability $P_j$ is greater than a probability threshold. The probability threshold is chosen to be sufficiently low as to indicate a preference of the operator O to ignore messages of that type. The probability threshold can be the same or different for different types of message. If the probability is greater than the probability threshold, the process 500 proceeds to a block 535. If the probability is less than the probability threshold, the process 500 proceeds to a block 540.

In the block 535, the computer 32 one of keeps the message threshold constant or adjusts the message threshold to make the message occur more frequently. To make the message occur more frequently, the message threshold is decreased if the value of the data must be greater than the message threshold to trigger the message, thus making it easier to exceed the message threshold, and the message threshold is increased if the value of the data must be less than the message threshold to trigger the message, thus making it easier to fall below the message threshold. The message threshold can be decreased or increased until the message threshold is at a minimum or maximum value, respectively. For example, the second preset duration can be decreased, thus being triggered sooner after the previous message prompting the operator O to enter information, down to a minimum value of time. The minimum or maximum values can be the same as the default values of the message thresholds used in the decision block 410 of the process 400 when the first profile is not identified. The increase or decrease of the message threshold can be by a predetermined value (having the same units as the message threshold) or by a predetermined percentage of the current message threshold, e.g., 5%. After the block 535, the process 500 proceeds to the decision block 545.

In the block 540, the computer 32 adjusts the message threshold to make the message occur less frequently. To make the message occur less frequently, the message threshold is increased if the value of the data must be greater than the message threshold to trigger the message, thus making it more difficult to exceed the message threshold, and the message threshold is decreased if the value of the data must be less than the message threshold to trigger the message, thus making it more difficult to fall below the message threshold. For example, the second preset duration can be increased, thus being triggered later after the previous message prompting the operator O to enter information. Adjusting the frequency in this way makes the messages less likely to occur when the operator O would ignore them while still occurring in the comparatively more extreme situations. After the block 540, the process 500 proceeds to the decision block 545.

In the decision block 545, the computer 32 determines whether the vehicle 30 is still on. If the vehicle 30 is still on, the process 500 returns to the decision block 515 to continue monitoring for messages to the operator O. If the vehicle 30 is off, the process 500 ends.

The process 500 provides techniques to customize delivery of output by the user interface 34, customizing a frequency of messages prompting the operator O to perform an action based on the identity of the operator and the operator's past behavior with respect to the messages. The customization can lead to fewer messages that the operator O is more likely to ignore while continuing to provide messages and/or providing additional messages based on more extreme values of the triggering events. Because the operator O receives fewer messages in this situation, the operator O may be more likely to respond to the retained messages. Message thresholds are stored in the profiles for individual operators, so that the customization can be provided for a specific individual. Operators who respond more often to the messages will continue to receive them at a comparatively high rate.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as an identifier and is not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory storing instructions executable by the processor to:
   in response to a mobile device synchronizing with a vehicle, identify a first profile from a plurality of profiles stored in the memory as associated with the mobile device by:
      extracting a predetermined set of information from data storing contact information for a plurality of contacts on the mobile device; and
      determining that the predetermined set of information matches data in the first profile;
   determine that a person associated with the first profile is an operator of the vehicle; and
   then perform an operation in accordance with a setting stored in the first profile.

2. The computer of claim 1, wherein identifying the first profile as associated with the mobile device includes determining that a unique identifier of the mobile device matches a unique identifier in the first profile.

3. The computer of claim 1, wherein identifying the first profile as associated with the mobile device includes, in response to determining that the predetermined set of information does not match the data in any of the profiles stored in the memory, determining that a unique identifier of the mobile device matches a unique identifier in the first profile.

4. The computer of claim 3, wherein identifying the first profile as associated with the mobile device includes, upon determining that the predetermined set of information does not match the data in any of the profiles stored in the memory and that the unique identifier of the mobile device does not match the data in any of the profiles stored in the memory, creating the first profile and then storing the predetermined set of information and the unique identifier of the mobile device in the first profile.

5. The computer of claim 4, wherein determining that the person associated with the first profile is the operator includes, upon creating the first profile, determining that the vehicle is in motion and that passenger seats of the vehicle are unoccupied.

6. The computer of claim 1, wherein the setting is a first setting, and determining that the person associated with the first profile is the operator includes determining a likelihood that a profile associated with the mobile device from the profiles is associated with the operator based on at least one value of at least one respective second setting of the vehicle that is adjustable by the operator.

7. The computer of claim 6, wherein the instructions further include instructions to, after determining that the person associated with the first profile is the operator, store the at least one value of the at least one second setting in the first profile.

8. The computer of claim 6, wherein the at least one second setting includes at least one seat position value.

9. The computer of claim 1, wherein determining that the person associated with the first profile is the operator includes determining that the vehicle is in motion and that passenger seats of the vehicle are unoccupied.

10. The computer of claim 1, wherein the instructions further include instructions to determine that the operator failed to perform an action in response to a message from a user interface prompting the operator to perform the action; then adjust a message threshold stored in the first profile to make the message occur less frequently; and provide the message upon receiving data beyond the message threshold.

11. The computer of claim 10, wherein the instructions further include instructions to store the failure to perform the action in the first profile, receive data indicating that the operator performed the action in response to the message, and store the performance of the action in the first profile.

12. The computer of claim 11, wherein the instructions further include instructions to calculate a probability that the operator performs the action in response to the message based on the performances of the action and the failures to perform the action stored in the first profile.

13. The computer of claim 12, wherein the instructions further include instructions to, in response to the probability being less than a probability threshold, adjust the message threshold stored in the first profile to make the message occur less frequently.

14. The computer of claim 13, wherein the instructions further include instructions to, in response to the probability being greater than the probability threshold, one of keep the message threshold constant or adjust the message threshold to make the message occur more frequently.

15. The computer of claim 12, wherein calculating the probability is based on the performances of the action and the failures to perform the action stored in the first profile that occurred within a predetermined previous distance traveled by the vehicle.

16. The computer of claim 10, wherein the data indicates that the operator failed to perform the action in response to the message when the action is not performed for at least a predetermined time threshold after the message.

17. The computer of claim 1, wherein performing the operation includes adjusting a component of the vehicle to match the setting.

18. The computer of claim 17, wherein the component is a seat.

19. A method comprising:
in response to a mobile device synchronizing with a vehicle, identifying a first profile from a plurality of profiles stored in a memory as associated with the mobile device by:
extracting a predetermined set of information from data storing contact information for a plurality of contacts on the mobile device; and
determining that the predetermined set of information matches data in the first profile;
determining that a person associated with the first profile is an operator of the vehicle; and
then performing an operation in accordance with at least one setting stored in the first profile.

* * * * *